Figure 1:
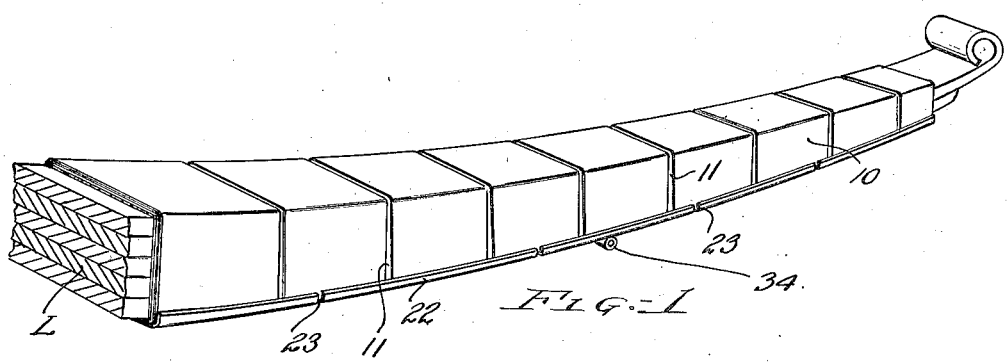

Dec. 14, 1926.

B. B. LEUSTIG

SPRING COVER

Filed March 12, 1924    2 Sheets-Sheet 1

1,610,865

INVENTOR
Benno B. Leustig,
By Baker Macklin,
ATTORNEYS

Dec. 14, 1926.

B. B. LEUSTIG 1,610,865

SPRING COVER

Filed March 12, 1924  2 Sheets-Sheet 2

INVENTOR
Benno B. Leustig,
By Baker Macklin,
ATTORNEYS.

Patented Dec. 14, 1926.

1,610,865

UNITED STATES PATENT OFFICE.

BENNO B. LEUSTIG, OF CLEVELAND, OHIO.

SPRING COVER.

Application filed March 12, 1924. Serial No. 698,641.

This invention is concerned with vehicle spring covers of the type which are adapted to receive lubricant under pressure whereby the lubricant can be forced throughout the length of the cover or spring leaves upon which it is mounted.

The general object of my invention is the provision of a spring cover construction which may be readily assembled and maintained upon a vehicle spring and which may have such structural characteristics as to be readily flexible during the placing thereof upon a vehicle spring and which may also readily correspond to the deflective and reflective movements of the spring.

A further object of my invention is the provision of a vehicle spring cover construction comprising channel-shaped stamped blanks slit or slotted transversely whereby when two or more of the blanks are superposed and formed into a channel shape, the cover may be readily assembled on a vehicle spring.

A still further object is the provision of a novel spring cover closure means for such a channel-shaped spring cover body which may be effective in closing the cover and securing the cover upon a vehicle spring, regardless of variations in the depth of the spring.

Other objects of my invention will be hereinafter set forth in the following description of a preferred form thereof as illustrated in the drawings. The essential characteristics are summarized in the claims.

Figure 2:
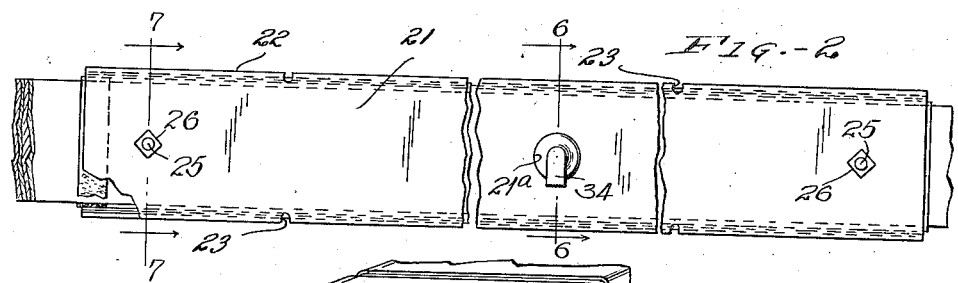
Figure 3:
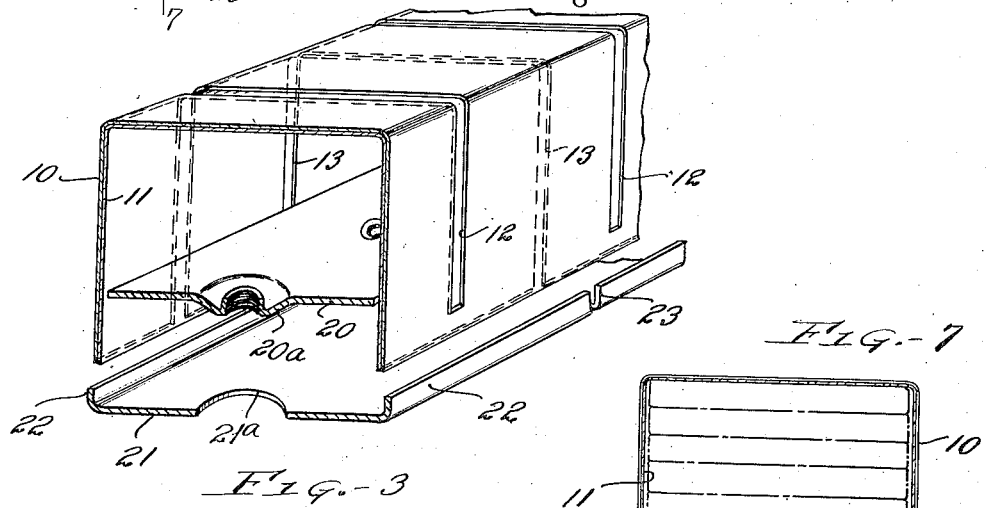
Figure 7:
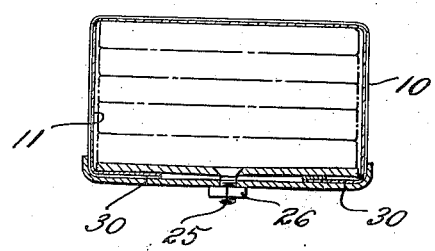
Figure 4:
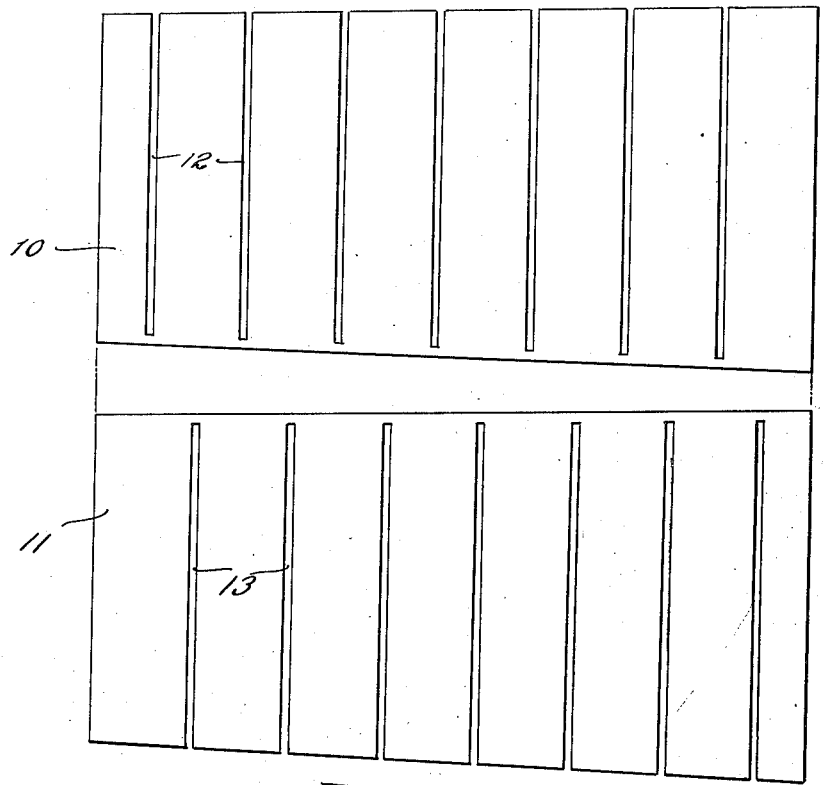
Figure 5:
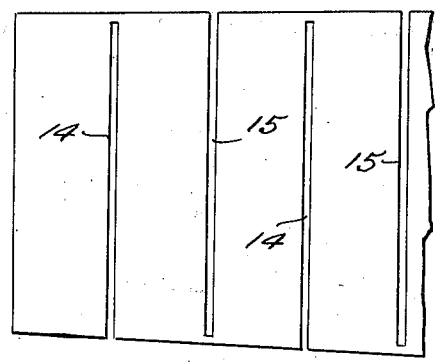
Figure 6:
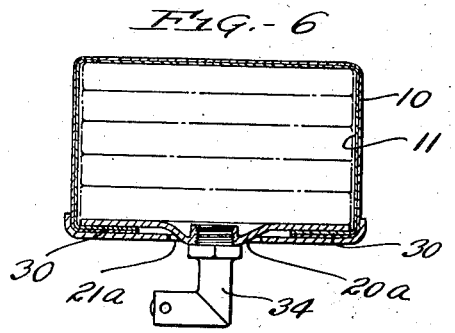

In the drawings Fig. 1 is a perspective view of a vehicle spring cover made in accordance with the objects of my invention and as it appears when assembled upon a vehicle spring; Fig. 2 is a bottom plan view of the same; Fig. 3 is an enlarged perspective view of various members comprising the cover shown in partially assembled relation; Fig. 4 is a diagrammatic plan view of the blanks which may be formed to comprise the major parts of the cover; Fig. 5 suggests an alternate manner of forming the blanks; Fig. 6 is a cross sectional view taken substantially along the line 6—6 of Fig. 2; Fig. 7 is a similar view substantially along the line 7—7 on Fig. 2.

The commercial development of vehicle spring covers has been such as to conform with the high pressure lubricating principles adopted by automobile manufacturers in appliances which are provided for lubricating various parts of automobiles.

My spring cover improvement accordingly contemplates the embodiment of characteristics which will permit the injection of heavy lubricants thereinto by the use of high pressure grease guns while providing a spring cover having such structural characteristics whereby it may be conveniently manufactured by the adoption of proven production methods. These characteristics are such as to also facilitate the ready assembling of the cover upon vehicle springs of various types and sizes and particularly to be readily adaptable to the variations in the depth of so called standard springs.

I accordingly form a channel or trough shaped shell comprising substantially three sides of the cover, and formed of two or more superposed metallic blanks which are transversely slotted to provide a full flexing movement of the shell. These blanks may be of such shape that they may be conveniently superposed with the respective slots of the superposed blanks out of alignment whereby the sections of one blank serve to seal the slots formed in the other blank, whereby the blanks when so superposed may be conveniently bent to the mentioned channel shape in a press.

As shown in Fig. 4 the blanks 10 and 11 may have a trapezoidal outline, the dimensions of which would be determined by the size and style of spring to be covered and which have transverse slots 12 and 13 respectively formed therein to extend substantially the width thereof, the slots in one blank however, being spaced with relation to the ends of the blank whereby they will be intermediate the slots formed in the other blank. These blanks once stacked or placed upon each other may be bent to the channel shape, shown in Fig. 3, without any resulting buckling or warping of the blank sections, whence the surface of one blank may closely contact with the surface of the other blank. This desired result, it will be noted, is obtained by permitting the blank ends to be free when the bending operation is being effected.

If desired the blanks may be formed as shown in Fig. 5 with certain of the slots 14 extending from one edge transversely of the blank and terminating short of the opposite edge while intermediate slots 15 may extend from the said opposite edge and terminate short of the first named edge. The spacing of the slots in a cooperating blank, relative to the ends thereof, of course would be determined in such manner that the slots of the respective blanks would lie intermediate each other as hereinbefore described.

A preferred construction for the fourth or closure side of the cover may comprise an inner metallic strip 20 of a length corresponding to the length of the cover and of a width substantially equal to the width of the spring to be covered and an outer closure member 21 preferably provided with longitudinal flanges 22 suitably notched as shown at 23 to permit a full flexing movement thereof. As shown in Fig. 7 these longitudinal members may be clamped together when the cover is completely assembled upon the spring by screw members 25 carried by the strip 20 and engaging nuts 26 which clamp the members together and in firm engagement with the turned-in ends 30 of the cover shell.

As shown in Fig. 6 a means for coupling a grease gun or other lubricant injecting means for filling the cover may comprise an elbow coupling 34 in threaded engagement with an upset portion 20ᵃ of the inner longitudinal strip member 20. The outer closure member 21 may be provided with an opening 21ᵃ to permit the passage of the elbow 34 therethrough.

The manner of assembling the spring cover is as follows:

The shell comprising the formed blank members 10 and 11 may be placed upon the spring laminations L of a vehicle with the free ends of the shell extending downwardly. The longitudinal strip 20 may then be placed between the legs of the shell in juxtaposition to the bottom side of the spring laminations. Any convenient means such as a clamp may serve to maintain this strip and shell in close fitting relation to the top and bottom of the spring leaves whereupon those portions of the shell which extend below the strip 20 may be bent inwardly and over the strip as shown in Figs. 6 and 7, the screw members 25 of course, having been previously positioned in suitable openings formed in the strip 20 before its application to the spring. The closure strip 21 may then be applied with the flanges 22 thereof engaging the shell along the longitudinal bent edges thereof. The clamping nuts 26 may then be assembled upon the screws 25 thus causing the outer closure plate 21 to firmly clamp the bent in edges 30 of the shell into engagement with the inner longitudinal closure plate 20. If desired the outer plate may be formed of metal of greater thickness than the inner plate to provide sufficient rigidity to obtain this clamping action. The coupling member 34 may then be attached to the strip 20.

From the foregoing description of my invention it will be apparent that the blanks may be cut from a single strip of metal on a bias whereby trapezoidal shapes will be obtained without wasting any metal, whereupon the slots may be readily punched therein and the blanks superposed and formed in a press without necessitating the use of any unusual production methods. Furthermore, it will be apparent that by forming the major portion of the cover in the form of a trough or channel shaped shell, the cover may be assembled in close fitting relation to the spring regardless of variations in depth of the spring or in the thickness of the leaves. In other words, the construction and assembly characteristics of the cover are such that the cover may be individually fitted to the spring without necessitating unusual experience and furthermore if it is desired to remove the cover to replace broken spring leaves the closure plates may be removed without any resulting deformation or destruction of the sections comprising the cover.

I claim:

1. In a vehicle spring cover, the combination of a plurality of channel shaped superposed members, each member being formed from a single metallic blank, having slots formed therein which when the blank is formed into a channel extends substantially around three sides of the channel.

2. In a vehicle spring cover, the combination of a plurality of channel shaped superposed members, each member being formed from a single metallic blank, having slots formed therein extending around three sides of the channel and which, when the blanks are formed into a channel are closed by sections of an adjacent blank.

3. In a vehicle spring cover, the combination of a plurality of channel shaped superposed members, each member formed from a single metallic blank, each blank having slots formed when the blank is being formed, which slots will be disposed in noncoincident relation to the slots in the other blanks and extend around three sides of the channel.

4. In a vehicle spring cover, the combination of a channel shaped cover body adapted to extend along three sides of a vehicle spring and closure means for the body comprising inner and outer layers of superposed flexible continuous strips of material positioned whereby the longitudinal edges of the strips may clamp the longitudinal edges of the channel shaped cover body.

5. In a vehicle spring cover, the combination of a cover body having relatively movable sections and a closure side for the cover comprising a longitudinal metallic strip adapted to be disposed between inwardly turned longitudinal edges of the cover body and a vehicle spring and a longitudinal outer member adapted to engage said inwardly turned edges of the body and means for securing both of said longitudinal members together whereby they may be caused to firmly engage the edges of the cover.

6. In a vehicle spring cover, the combination of a cover body having relatively movable sections adapted to engage four sides of a spring, a closure side for the cover comprising a longitudinally extending member adapted to be disposed intermediate portions of the cover body and a vehicle spring, an outer member adapted to engage said portions and means for securing the outer member to the longitudinally extending member whereby they may be caused to firmly engage said body portions.

7. A spring cover of the character described, comprising a series of relatively movable sections adapted to embrace substantially three sides of a spring and cover closure means comprising superposed longitudinally extending clamping members, one lying adjacent the spring and within the edges of the sections, the other lying without the edges of the sections, both members cooperating to clamp the longitudinal edges of the sections.

8. A spring cover of the character described, comprising a series of relatively movable sections adapted to embrace substantially three sides of a spring with portions thereof extending over the fourth side and clamping members, one lying within and the other without said portions and adapted to clamp said over extending portions of the sections.

9. A spring cover of the character described, comprising a series of relatively movable sections adapted to embrace substantially three sides of a spring and extend over the fourth side thereof, cover closure members adapted to clamp said extensions to maintain the cover in position, and means for urging said members together to effect the clamping action.

10. In a vehicle spring cover, the combination of a plurality of spaced apart sections adapted to embrace substantially three sides of a vehicle spring, said sections being joined along the longitudinal edges thereof, a second group of sections superposed on the first sections and similarly joined and means comprising the fourth side of the cover for clampingly engaging the longitudinal edges of the sections.

11. In a vehicle spring cover, the combination of a plurality of spaced apart sections adapted to embrace substantially three sides of a vehicle spring, said sections being joined along the longitudinal edges thereof, a second group of sections superposed on the first sections and similarly joined said sections having the ends thereof extending in a direction to form a part of the fourth side of the cover and means for clampingly engaging said extensions and to thereby close the cover.

12. As an article of manufacture, a blank adapted to be formed into a spring cover having a trapezoidal contour and having slots formed therein extending transversely, substantially the width of the blank.

13. As an article of manufacture, a blank adapted to be formed into a spring cover comprising one piece of metal having slots formed therein extending transversely, substantially the width of the blank.

14. As an article of manufacture, a metallic blank having a width of considerably less dimensions than its length and having portions removed to form slots extending transversely, substantially the width of the blank, whereby the blank may comprise relatively movable sections.

15. As an article of manufacture a metallic blank of trapezodial contour having a plurality of slots formed therein extending substantially the width of the blank whereby the blank portions intermediate the slot may be relatively movable when the blank is formed into a cover.

16. As an article of manufacture a metallic blank of trapezodial contour having a plurality of slots formed therein extending substantially the width of the blank alternately from opposite sides thereof whereby the blank portions intermediate the slots may be relatively movable when the blank is formed into a cover.

17. As an article of manufacture a pair of metallic blanks having a plurality of slots formed therein extending substantially the width of the blanks, the slots in one blank being spaced relatively to the slots in the other blank so that when they are superposed and the blanks formed into a cover the slots of the respective blanks are closed.

18. In a vehicle spring cover a plurality of spaced apart sections adapted to straddle three sides of a vehicle spring with the ends of the sections extending over the fourth side of the spring and means comprising the fourth side of the cover for engaging said ends, including clamping members between which the said ends are adapted to extend.

19. In a vehicle spring cover, a channel formed member adapted to extend longitudinally of the vehicle spring when placed thereon and means for closing the open side of the channel comprising longitudinal members formed to clampingly engage the free ends of the channel, and means for securing said members together.

20. In a cover for a laminated vehicle spring, the combination of two nested channel-shaped members extending longitudinally of the cover, each channel-shaped member being formed from a single metallic blank having transverse slots which, when the blank has been formed into said channel-shaped member, extend transversely of and across three like sides of the cover and are disposed in noncoincident relation to the slots in the other channel-shaped member, and means for forming the fourth side of the cover and for holding said channel-shaped members in place.

21. In a cover for a laminated vehicle spring, the combination of an inner series of substantially U-shaped sections which are spaced longitudinally of the cover and participate in the formation of three sides of the cover and are connected together at the fourth side of the cover, an outer series of substantially U-shaped sections which are spaced longitudinally of the cover and arranged at the outer sides of the first mentioned sections and disposed to cover the spaces between said first mentioned sections and connected together at the said fourth side of the cover independently of said first mentioned sections, and means for forming said fourth side of the cover and for holding the cover in position.

22. In a cover for a laminated vehicle spring, the combination of an inner series of sections which are spaced longitudinally of the cover and shaped to participate in the formation of three sides of the cover, an outer series of sections which are spaced longitudinally of the cover and shaped to participate in the formation of the same in said sides of the cover and arranged at the outer sides of the first-mentioned sections and disposed to cover the spaces between said first-mentioned sections, the sections of each series of sections having extensions participating in the formation of the fourth side of the cover, and the extensions of the sections of the second mentioned series being arranged opposite the outer sides of the extensions of the sections of the first mentioned series, and means cooperating with said extensions of the sections of both series in forming the aforesaid fourth side of the cover, each series being formed of a single sheet metal piece.

23. In a cover for a laminated vehicle spring, the combination of an inner channel shaped member extending longitudinally of the cover and shaped and slotted to form a series of sections which are spaced longitudinally of the cover and adapted to straddle the spring and thereby participate in the formation of three sides of the cover, an outerchannel-shaped member embracing and extending longitudinally of the first-mentioned channel-shaped member and shaped and slotted to form a series of sections which are spaced longitudinally of the cover and arranged at the outer sides of the first mentioned sections and disposed to cover the spaces between said first-mentioned sections, the sections of each series of sections being connected together at the fourth side of the cover independently of the sections of the other series of sections, and means forming said fourth side of the cover and for holding the cover in position.

In testimony whereof, I hereunto affix my signature.

BENNO B. LEUSTIG.